United States Patent
Vembar et al.

(10) Patent No.: US 9,886,084 B2
(45) Date of Patent: Feb. 6, 2018

(54) USER INPUT VIA ELASTIC DEFORMATION OF A MATERIAL

(71) Applicant: Intel Corporation, Santa Clara, CA (US)

(72) Inventors: Deepak Vembar, Portland, OR (US); Glen J. Anderson, Beaverton, OR (US); Lenitra M. Durham, Beaverton, OR (US); Kathy Yuen, Portland, OR (US); Ryan Scott Brotman, Beaverton, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 14/538,390

(22) Filed: Nov. 11, 2014

(65) Prior Publication Data

US 2016/0132103 A1    May 12, 2016

(51) Int. Cl.
*G06F 3/041* (2006.01)
*G06F 3/01* (2006.01)
*G06F 3/03* (2006.01)

(52) U.S. Cl.
CPC ............... *G06F 3/011* (2013.01); *G06F 3/03* (2013.01)

(58) Field of Classification Search
USPC ........................................................ 345/173
See application file for complete search history.

(56) References Cited

U.S. PATENT DOCUMENTS

| | | |
|---|---|---|
| 2006/0001646 A1 | 1/2006 | Hai |
| 2008/0084385 A1 | 4/2008 | Ranta et al. |
| 2011/0134074 A1* | 6/2011 | Norieda ............... G06F 1/163 345/174 |
| 2014/0198034 A1 | 7/2014 | Bailey et al. |
| 2014/0306821 A1 | 10/2014 | Rahman et al. |

FOREIGN PATENT DOCUMENTS

| | | |
|---|---|---|
| WO | WO-2014078210 A2 | 5/2014 |
| WO | WO-2016077178 A1 | 5/2016 |

OTHER PUBLICATIONS

"International Application Serial No. PCT/US2015/059540, International Search Report dated Feb. 24, 2016", 3 pgs.
"International Application Serial No. PCT/US2015/059540, Written Opinion dated Feb. 24, 2016", 7 pgs.

* cited by examiner

*Primary Examiner* — Gustavo Polo
(74) *Attorney, Agent, or Firm* — Schwegman Lundberg & Woessner, P.A.

(57) ABSTRACT

System and techniques for user input via elastic deformation of a material are described herein. The morphology of an elastic material may be observed with a sensor. The observations may include a first and a second morphological sample of the elastic material. The first and second morphological samples may be compared against each other to ascertain a variance. The variance may be filtered to produce an output. The output may be translated into a user input parameter. A device action corresponding to the user input parameter may be invoked.

25 Claims, 8 Drawing Sheets

USER INPUT VIA ELASTIC DEFORMATION OF A MATERIAL

TECHNICAL FIELD

Embodiments described herein generally relate to a user input device and more specifically to user input via elastic deformation of a material.

BACKGROUND

People interact with computing devices through physical user interface elements (e.g., user input devices), such as keyboards, pointing devices, touch devices, etc. These devices are physically manipulated to produce signals used to manipulate one or more elements of the computing device, such as an operating system, application, or other program implemented by the computing device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Although the user input devices discussed above provide some solutions to the problem of allowing a user to interact with a user device, the user input devices discussed above tend to involve either a physical manipulator communicatively attached to the user device (e.g., a mouse, digital tablet, pen, etc.) or occupy a physical region of the user device (e.g., an integrated track point, joystick like pointer, touch pad, touchscreen, etc.). Having a physical manipulator separate from the user device may be cumbersome and prone to loss. Having the user input device integrated into a surface of the user device may result in difficult input methods when the surface is small (e.g., in small devices such as a wearable device modeled after a bracelet or eyeglasses) and reduce the number of options (e.g., other devices such as displays) for limited surface space.

An alternate solution to the user input devices discussed above is to use a readily available elastic surface as an interaction platform from which user input may be determined. That is, by monitoring elastic deformations in a material, such as the user's skin, user input may be determined without using valuable device accessible surface area or a clumsy physical manipulator. This approach is contrasted with other user input methods that may involve, for example, a user's skin or elastic clothing, such as using these materials as a display surface (e.g., displaying a grid on the skin and detecting interaction with the grid), a landmark for device motion (e.g., moving a bracelet up and down a wrist), or detecting sound (e.g., using sound propagating through the skin to detect taps on the skin). Detecting the elastic deformation of the material permits a wide range of gestures that may not be realized with these other methods.

Figure 1:
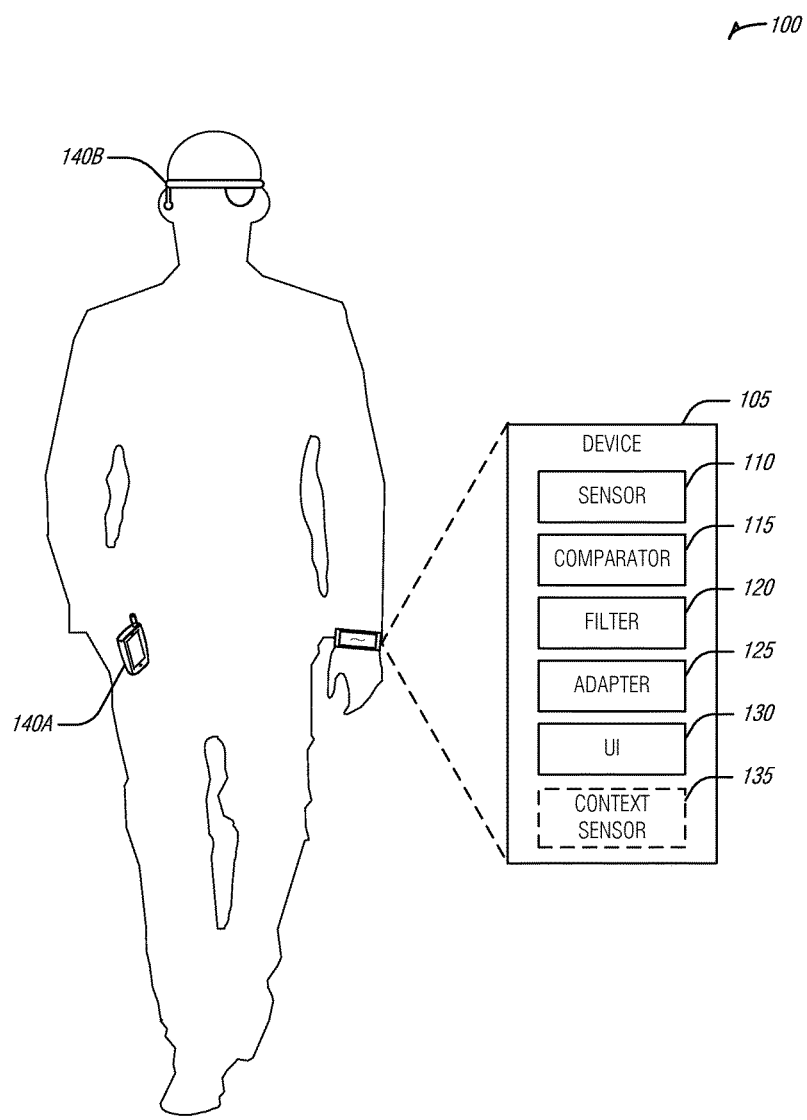
FIG. 1 is a block diagram of an example of a system for user input via elastic deformation of a material, according to an embodiment.

FIG. 1 is a block diagram of an example of a system 100 for user input via elastic deformation of a material, according to an embodiment. The system 100 may include a user input device 105. In an example, the user input device 105 may also be a user device (e.g., the user input device does more than simply provide user input). In an example, the system 100 may also include one or more other user devices 140, such as a mobile phone 140A or a wearable headset 140B, that may receive user input from the user input device 105. In an example, the user input device 105 is a wearable device. In an example, the user input device 105 is a bracelet.

The user input device 105 may include a sensor 110, a comparator 115, a filter 120, an adapter 125, and a user interface 130. The sensor 110 is positioned relative to a body of the user input device 105 so as to observe the morphology of an elastic material. Thus, for example, if the body of the user input device 105 is in the shape of a bracelet (e.g., a wristwatch form factor), the sensor 110 may be positioned on an interior, or edge, surface of the bracelet. Similarly, if the user input device is in a pendant form factor, the sensor may be placed on the back of the pendant so as to observe the chest when worn. The elastic material is capable of elastic deformation. That is, the material may be deformed and will return to its original shape. In this context, the original shape is a baseline that may include variations below a context sensitive threshold. For example, while a sleeve of clothing may deform throughout normal wear, the deformations are generally of a different character than plucking a portion of the sleeve up and away from the arm. In an example, the elastic material is skin. In an example, the material is a fabric, such as spandex or other elastic material.

The sensor 110 may include one or more sensing elements. The sensing elements may include any or all of photonic elements (e.g., capable of sensing photons such as general light sensors, cameras, laser range finders or other depth detectors, etc.), pressure elements (e.g., strain gauges, etc.), electrical component elements (e.g., conductance sensing elements, capacitive sensing elements, etc.), or sound elements (e.g., ultrasonic range-finder, etc.). Some or all of the sensing elements of the sensor 110 may participate in producing a number of morphological samples of the elastic material, including at least a first morphological sample and a second morphological sample.

Photonic elements operate by sensing (e.g., capturing) photons reflected from the elastic material. Such elements may include cameras, photo resistors, etc. In an example, the user input device 105 includes an emitter positioned to emit light to reflect from the elastic material to the sensor 110. Thus, for a wrist mounted user input device 105, where the sensor is on the wrist-ward portion of the bracelet, the emitter would similarly be positioned on the wrist-ward side of the bracelet. In an example, the photonic elements are sensitive to infrared light. In an example, at least the first and second morphological samples are images captured by the sensor 110.

In an example, the user input device 105 may include a flexible material into which the sensor 110 is embedded. The flexible material may be connected to the user input device 105 physically (e.g., via wires or the like) or wirelessly (e.g., via electromagnetic signals, sound signals, vibratory signals, or the like). The flexible material includes an adhesive, or has an adhesive property, and operates when adhered to the flexible material. The adherence is such that morphological changes in the elastic material are reflected in the flexible material. Thus, for example, piezoelectric fibers embedded in the flexible material may provide stress (e.g., push, pull, twist, etc.) indications of morphological changes without having to, for example, embedded them within the skin. In an example, the sensing elements embedded in the flexible material are capacitive electrical component elements.

In an example, the sensor 110 may divide the observable elastic material into a plurality of regions. These regions may be distinct or overlap to some degree (but not completely). The regions may be defined by subsets of the sensing elements. For example, sensing elements on one side of the user input device 105 may correspond to a first region while sensing elements on another side of the user input device 105 may correspond to a second region.

The comparator 115 may obtain (e.g., retrieve or be given) at least the first and second morphological samples and compare them against each other to ascertain a variance. In an example, one of the morphological samples is subtracted from another to produce the variance. In an example, elements in the samples are compared and like, or different elements are identified and constitute the variance. In an example, where the morphological samples are images, the variance is a difference between normalized versions of the images. Image normalization may include reducing the number of colors, aligning the images to a common coordinate, edge detection, or other image processing mechanisms to reduce the information and allow for more straightforward identification of the differences between the samples.

Figure 4:
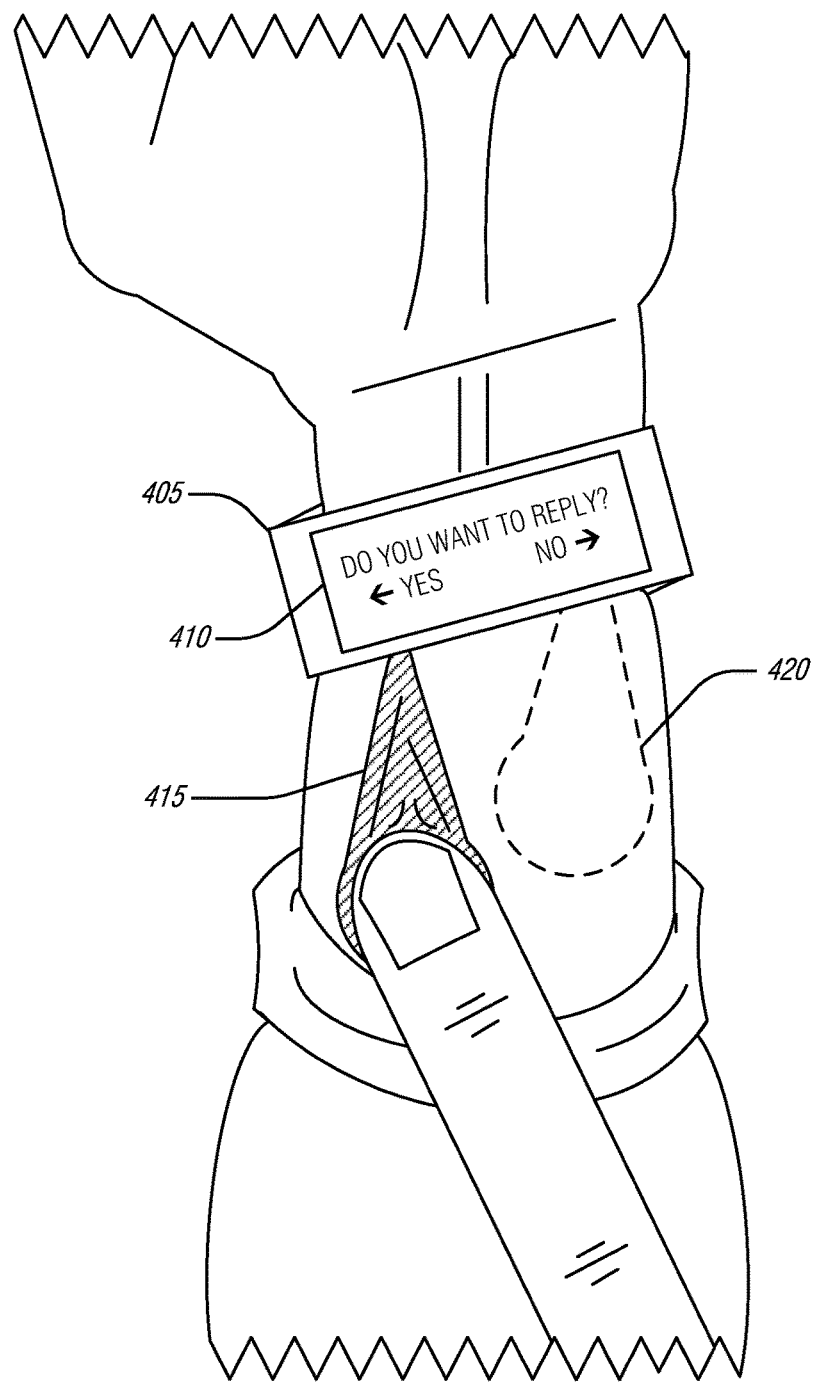
FIG. 4 illustrates an example of a use case for user input via elastic deformation of a material, according to an embodiment.

The filter 120 may produce an output by applying a model to the variance. In an example, the output is binary, either on or off. In an example, the output is a matter of degree (e.g., a value in a range of values). In an example, the model includes a pattern to which the variance is compared and the output dependent on whether the variance matches the pattern within a threshold. The threshold in conjunction with the pattern discriminates between an intended input action by the user and incidental elastic deformation of the material that may occur. For example, in a gesture that pulls the material away from the user input device by a single probe (e.g., finger), the pattern may be a series of lines arranged in a tear-drop with the narrow portion under the user input device (e.g., as shown in FIG. 4 at the depression 415). As there is usually variation in the specific expression of such a pattern from one interaction to the next, the threshold permits fidelity to the pattern while allowing for this variation. In an example, the threshold may be dynamically adjusted based on indications that either an input was not recognized and should have been, or an input was recognized that should not have been.

In an example, the model may include a plurality of patterns and the output depends on which of the plurality of patterns the variance matches within a corresponding threshold. In an example, the corresponding threshold may specific to a pattern in the plurality of patterns, or may correspond to more than one pattern. By including a variety of patterns, different elastic deformations may be recognized by the same sensor 110. For example, pulling the elastic material corresponds to a different pattern than pushing the elastic material; however both may be detected in the same portion of the elastic material via the pattern to variance matching described.

In an example, the patterns in the plurality of patterns each correspond to an elastic material gesture. According, the output provides an identification of the corresponding gesture. In an example, gestures in a subset of the gestures result from multiple probes deforming the elastic material. For example, two fingers squeezing the elastic material, two fingers twisting the elastic material, etc. Some examples of these gestures are described below with respect to FIGS. 6A-6D. In an example, the gestures in a subset of the gestures result from a probe deforming the elastic material over at least two periods of time. In this example, the pattern may include a time component, such that the variance is combined with one or more additional variances over time. Thus, multiple elastic deformations (e.g., a double tap) may be recognized as gestures. Further, the time component may be used to determine duration of any individual elastic material interaction (e.g., a long tap).

As noted above, elastic material gestures may include single probe interactions, multi-probe interactions, and multiple single probe interactions overtime, or any combination thereof. The following are some of the recognized gestures. Where a directional component is indicated, it is in relation to the sensor 110. Elastic material gestures may include a push (single or multi-probe), a pull (single or multi probe), a depression (e.g., pushing into the surface of the elastic material, the surface being that exposed to the sensor 110, such as the outside of the skin), an elevation (e.g., pulling the surface perpendicular to the general surface orientation at the point of the pulling), a squeeze (multiple probes pulling the elastic material towards each other, e.g., a pinch), a separation (multiple probes pulling the elastic material away from each other), a sheer, or a twist. As noted above, some of these multi-probe gestures are described below with respect to FIGS. 6A-6D.

In an example, the pattern may include a position element or an orientation element. Thus, multiple patterns may differentiate between elastic material interactions, not only on the pattern, but on where the pattern is found in the variance (e.g., position) or on the orientation of the patter. For example, two pulls on wrist skin, the first parallel to the arm and the second at another angle (e.g., perpendicular), may be recognized as separate gestures.

In an example, the filter 120 may identify a plurality of regions of the elastic material. This may be accomplished by dividing up a sample space from which the variance is derived and may be located within. Thus, the position element may be determined to be within one of these regions. In an example, the output is based on the previously described pattern matching within the regions. Thus, the same pattern detected in different regions produces a different output. In an example, in an example, the user input parameter, when derived from a region variance in a first region of the plurality of regions is different than the user input parameter when derived from the region variance in a second region from the plurality of regions, the region variance being the portion of the variance corresponding to a region in the plurality of regions.

In an example, at least one of the sensor 110, comparator 115, or the filter 120 is calibrated to ignore morphological changes of the elastic material corresponding to unintentional deformations. These calibrations may include, as described above, thresholding such that a measured morphological change is not passed on to a later component unless is exceeds the threshold. In an example, the sensor 110 may have a variable sensitivity to enact the threshold. In an example, the comparator may employ a normalization procedure to the samples before comparing them to effect the calibration. Such normalization may include reducing the resolution of the compared morphological samples, quantifying elements of the samples, etc. In an example, the model employed by the filter 120 may be a thresholded pattern, as described above.

The calibrations may be implemented by a training circuit set, possibly specific to any of the sensor 110, comparator 115, or filter 120. The training circuit set may receive an indication of a no-input training interval and quantify observations as indicative of no intentional user interactions with the elastic material. Similarly, an input training interval may be indicated, in which intentional user interactions may be detected. In an example, the training may include a context signal, such as that described below, to model different physical activities, such as being stationary, walking, running, sitting, driving, etc. Thus, the calibrations discussed above may differ based on the context signal.

The adapter 125 may translate the output into a user input parameter. The user input parameter corresponds to a known device. For example, if the device is a mouse, the user input parameter may include a button click, coordinates, etc. In an example, the translation may include mapping the output to the user parameter based on a mode-map, where a selected mode of the user input device 105 defines to which user input parameter the output translates. For example, output representing a pull on the left side of the device may be an option selection (e.g., discrete selection, such as pushing a button, or a click) in a first mode and may be a continuous manipulation of an option (e.g., ongoing, such as adjusting volume, holding a button down, scrolling, etc.) in a second mode. The mode selection may be performed via a previous gesture, another control (e.g., a mode selector switch on the user input device 105), an application executing on the user input device 105, or from an external source (e.g., user devices 140A or 140B).

The user interface 130 may invoke an action of the user input device 105 that corresponds to the user input parameter. In an example, the action includes outputting perceptible feedback from the device 105. This perceptible feedback may include a vibration, a sound, a light, etc. to indicate that the elastic material interaction was recognized as an input. This perceptible feedback may also include displaying (e.g., via a visual display, audibly, etc.) the result provided by an application of the user input device 105 in response to the user input parameter. This last example occurs in the case where the user input device 105 also includes some interactive functionality (e.g., running software).

In an example, the action includes transmitting the user input parameter to another device, such as either or both of user devices 140A or 140B. Thus, the user input device 105 may provide a convenient input mechanism for these other devices. For example, a gesture may be mapped to diverting a call to voice mail. Accordingly, the user need not take the phone 140A out of her pocket in order to silence the ringing in a meeting. Also, a touchable surface space limited device, such as a spectacle modeled headset display and speaker, may benefit from the user input flexibility provided by the user input device 105 without conspicuous gestures near the face.

As discussed above, the specific user input parameter produce by the adapter 125 may be mode dependent. In an example, this mode may be determined from an optional context sensor 135 of the user input device 105. The context sensor 135 may receive a context signal. The context signal may be one of a plurality of possible states. The context signal may be an additional context input into any or all of the sensor 110, the comparator 115, the filter 120, or the adapter 125. In an example, the context signal is a proximity measurement for another device. In an example, the context signal identifies the other device. In an example, the proximity signal identifies a type of the other device. For example, the user input device 105 may disable the sensor 110 when the context signal indicates that another device is not present (or the signal is not available), and enable the sensor 110 when the other device is within a certain range. This sensitivity may be further refined to only enable the sensor 110 when, for example, a phone 140A is proximate to the user input device 105. Further, it may be refined to enable the sensor 110 when the user's phone 140A is proximate to the user input device 105.

In an example, the context signal may be used by the comparator 115 to modify the variance based on the state of the context signal. In an example, the variance may be ignored when the context signal is in a first state (e.g., no proximate device) and permitted as normal otherwise. In an example, the context signal state may define a normalization standard for determining the variance, for example, based on the device type indicated in the context signal. Thus, a simpler input mechanism (e.g., volume control for the headset 140B speakers) may use a more reductive normalization to reduce input errors at the cost of the number of permissible user input parameters that are derivable.

In an example, the model from the filter 120 may also incorporate the context signal in producing the output. As discussed above with respect to the comparator 115 and the sensor 110, this incorporation may disable output when the other device is not near. In an example, the model increase or reduce the number of patterns it tries to match to the variance based on the type of device. Thus, different devices may have different elastic material deformation languages.

In an example, the context signal is an identification of a social situation. In this context, a social situation is one involving the user and at least one other person. The context signal may identify friendly devices, for example as received in a list from a social networking service. The identification of these devices, or positions of people in the social situations, may influence the action of the user input device 105 take in response to the user input parameter. For example, if a file browser has a file selected, a swipe, on the arm in the direction of a social situation participant, may initiate transfer of the file to that participant.

In an example, the context sensor 135 may include a physical interactive element on the user input device 105. Examples of the physical interactive element may include a touch sensitive area, a switch, button, photo-sensor, etc. Thus, the user may directly interact with the interactive element to provide the context signal. For example, the user may cover a photo-sensor on a wristband to enable the user input functionality of the user input device 105 described above.

Figure 2:
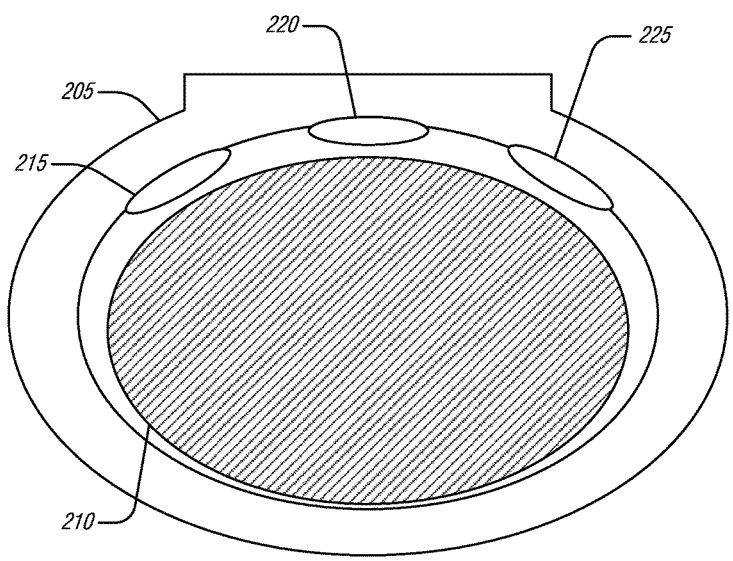
FIG. 2 illustrates a schematic of an example of a wearable device for user input via elastic deformation of a material, according to an embodiment.

FIG. 2 illustrates a schematic of an example 200 of a wearable device 205 for user input via elastic deformation of a material, according to an embodiment. In the example 200, the wearable device 205 encircles part of a body 210, such as a wrist, arm, ankle, leg, neck, etc. The device 205 includes the sensing elements 215, 220, and 225 as part of the sensor. The sensing elements 215, 220, and 225 are positioned so as to observe the surface of the elastic material covering the body 210. As illustrated, the sensing elements are on an interior surface of the device 205. In an example, one or more of the sensing elements 215, 220, or 225 may be placed partially, or fully on an edge of the device 205, to, for example, observe elastic deformations of the material that do not occur directly beneath the device 205.

Figure 3:
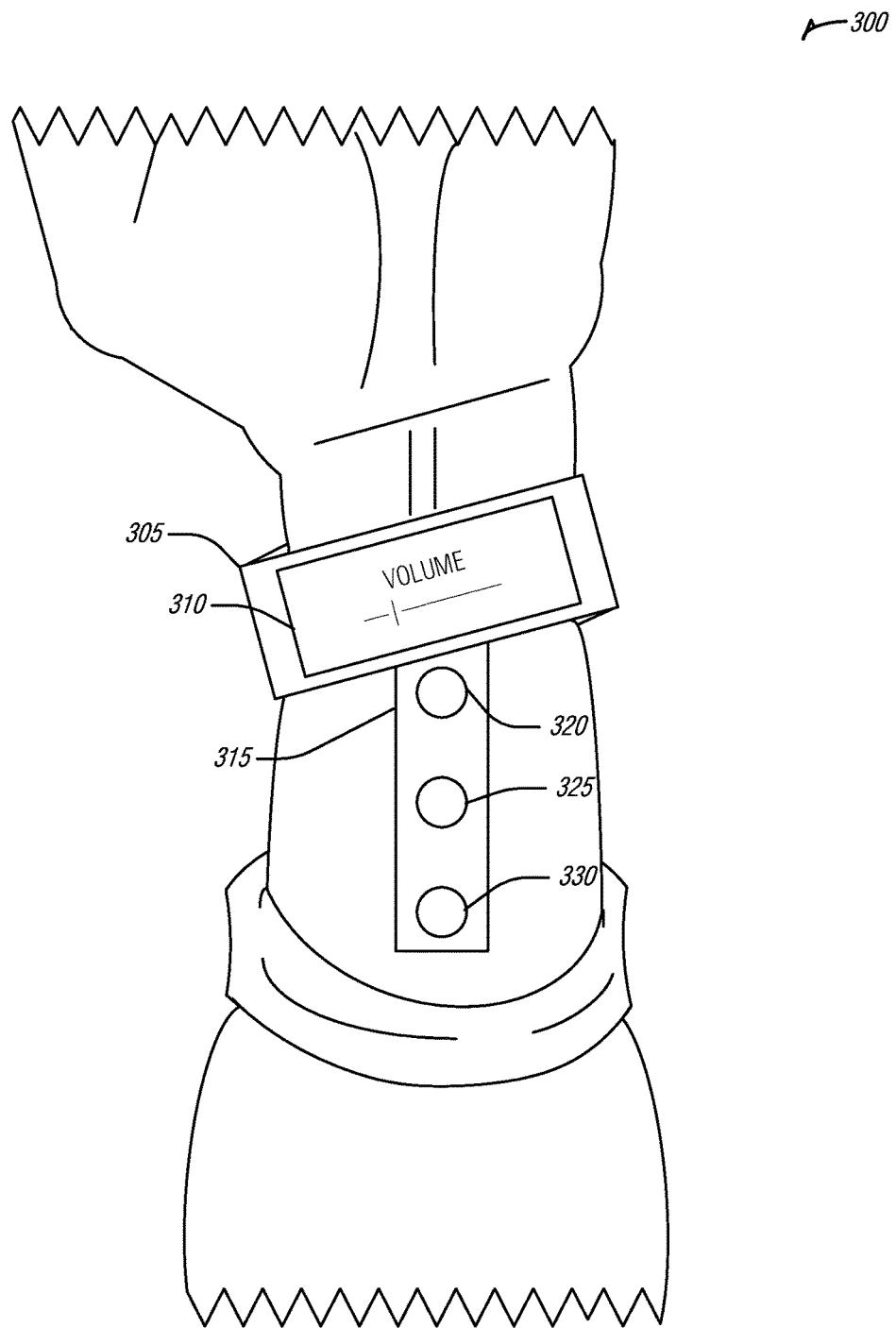
FIG. 3 illustrates a schematic of an example of a wearable device with sensor embedded in a flexible material for user input via elastic deformation of a material, according to an embodiment.

FIG. 3 illustrates a schematic of an example 300 of a wearable device 305 (including a display 310) with sensor embedded in a flexible material 315 for user input via elastic deformation of a material, according to an embodiment. As described above with respect to FIG. 1, the flexible material 315 is adhered to the elastic material so that deformations in the elastic material are reflected in the flexible material. Example flexible materials may include tape (e.g., paper, fabric, polymer, with an adhesive backing), paint (e.g., material suspended in a solvent), or the like. Also as described above, the sensing elements 320, 325, and 330 of the sensor may be embedded in the flexible material 315. This embedding permits accurate use of a large elastic surface, such as the skin, for user input without the need to modify (e.g., implants) the surface itself. Moreover, because the elastic material provides structure, the flexible material need only house the sensing elements, and need not provide structure beyond, for example, the relational position of the elements. Thus, the flexible material need not be stiff enough, for example, to overcome the actuation force of a pressure sensing element (e.g., sensing element 330), but rather merely maintain relative positions of the sensing elements 320, 325m 330 to, for example, allow differentiation of actuation for a gesture that starts at sensing element 320 and moves down toward sensing element 330.

Sensing elements 320, 325, or 330, may vary from those described above with respect to FIG. 2, in that the inclusion of the sensing elements 320, 325, or 330 in the flexible material 315 simulates the inclusion of sensing elements in the elastic material itself. Thus, capacitive sensing elements may be used to detect where an interaction occurred, rather than inferring the interaction position as transmitted via the deformation to a remote location (e.g., touch the skin below the bracelet is detected via the deformation pattern in examples such as example 200 above).

FIG. 4 illustrates an example of a use case for user input via elastic deformation of a material, according to an embodiment. A device 405 includes a display 410. The display 405 includes an application output (e.g., for a messaging application). The device 405 may provide indicators of gestures that will be accepted given the current context, for example, depressing the wrist to the left 415 is a "yes" and depressing the wrist to the right 420 is a "no." The left depression 415 illustrates an elastic deformation of skin. It is noted that the deformation includes stress lines that may be matched to a pattern, as described above with respect to FIG. 1. It is also noted that the elastic deformation telegraphs the interaction (e.g., the finger pushing on the skin) to the device 405.

Figure 5:
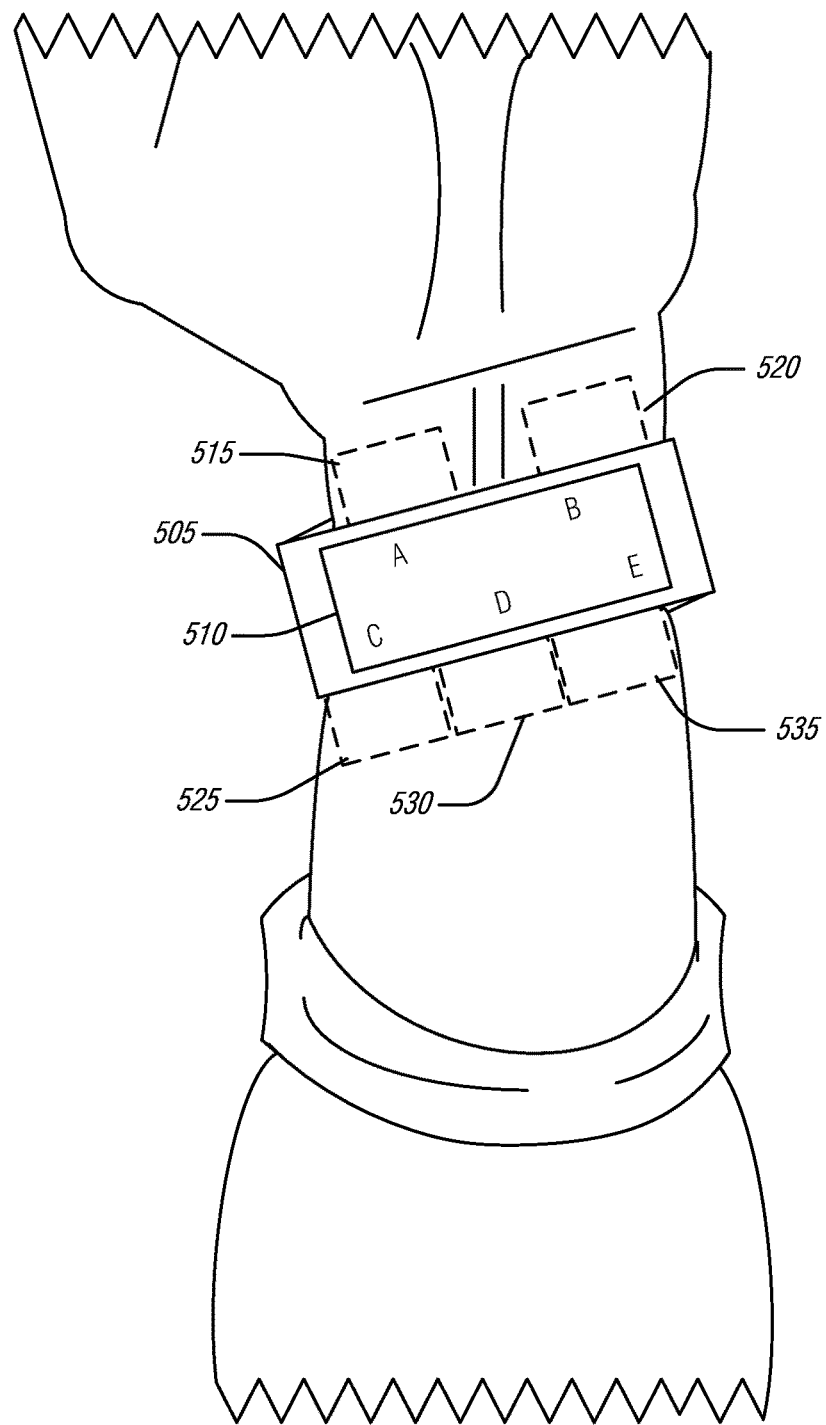
FIG. 5 illustrates a variety of elastic material regions in relation to a device for user input via elastic deformation of a material, according to an embodiment.

FIG. 5 illustrates a variety of elastic material regions 515-535 in relation to a device 505 for user input via elastic deformation of a material, according to an embodiment. As described above with respect to FIG. 1, a plurality of regions 515-535 of the elastic material may be identified. These regions 515-535 may be identified by sensing element arrangement, variance determination, or filtering as described above. The identification of the regions may be used in determining elastic material interaction measurements, such as location, or orientation. In an example, the same elastic material interaction may provide for different user input parameters based on the originating region of the interaction.

The device 505 includes a display 510. In an example, the display 510 may include simple lighting elements corresponding to each of the illustrated letters, A-E. Thus, a light-emitting diode (LED) may be in the position occupied by A. In an example, the display 510 provides an indication to the user as to available regions within which an elastic material interaction will be accepted as user input. In an example, an emitter of the device 505 may project light onto the elastic material to indicate the presence of, or bounds of, the regions 515-535.

Figure 6A:
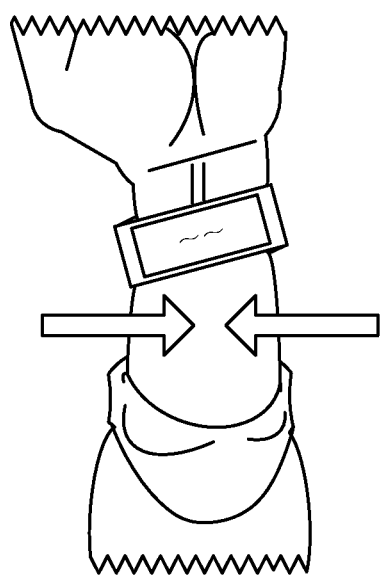
FIGS. 6A-6D illustrate several input gestures that may be recognized by a device, according to an embodiment.
Figure 6B:
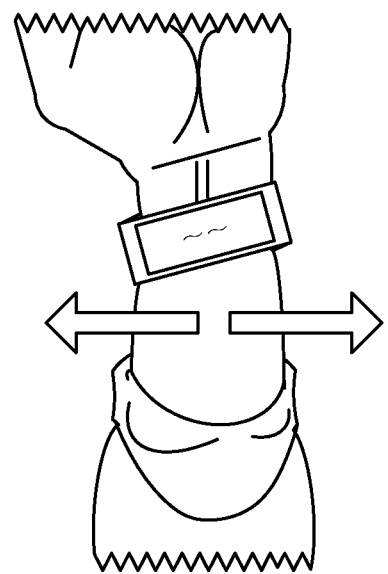
Figure 6C:
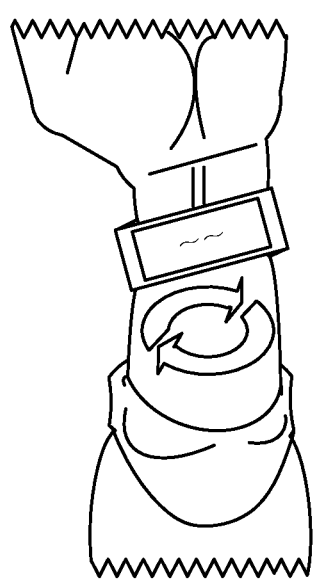
Figure 6D:
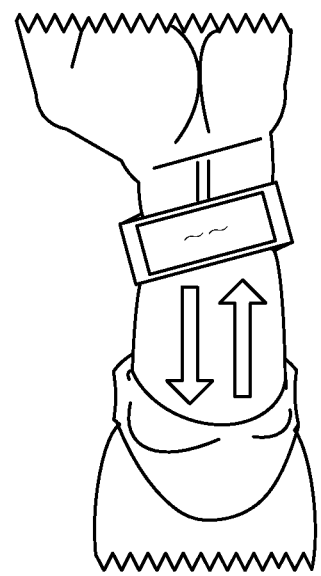

FIGS. 6A-6D illustrate several input gestures that may be recognized by a device, according to an embodiment. As illustrated, the gestures of FIGS. 6A-6D involve two probes (e.g., fingers), and the arrows represent motion of the probes parallel with the surface of the elastic material. Thus, FIG. 6A illustrates a squeeze gesture, such as a pinch, gather, etc. FIG. 6B illustrates a separation gesture, such as pulling apart, or the opposite of the squeeze. FIG. 6C illustrates a twisting gesture, which may be in either direction (e.g., clockwise or counterclockwise). FIG. 6D illustrates a sheer gesture.

Figure 7:
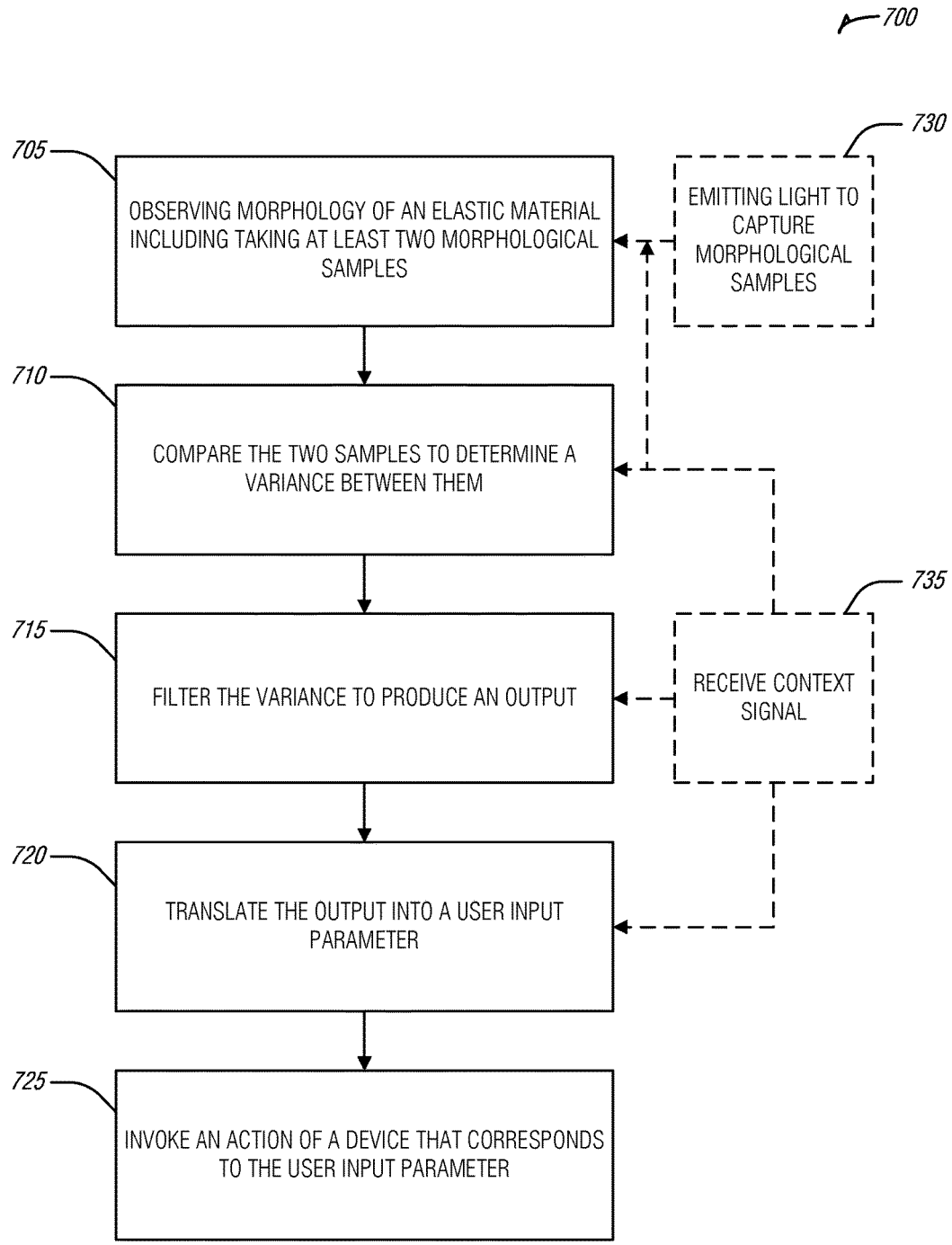
FIG. 7 is a flow diagram of an example of a method for user input via elastic deformation of a material, according to an embodiment.

FIG. 7 is a flow diagram of an example of a method 700 for user input via elastic deformation of a material, according to an embodiment. The operations of the method 700 are performed on a device, such as that described below with respect to FIG. 8. In an example, one or more of the components discussed above with respect to FIG. 1 may be used to implement the operations of the method 700.

At operation 705, the morphology of an elastic material may be observed. These observations may be performed by a sensor of the device and include at least two morphological samples. In an example, the sensor is photonic and observing the morphology includes capturing photons reflected from the elastic material. In an example, the first morphological sample and the second morphological sample are images captured by the sensor.

At operation 710, the two morphological samples may be compared to determine a variance between them.

At operation 715, the variance of operation 710 may be filter to produce an output. The filter may use a model to which the variance is applied to produce the output. In an example, the model includes a pattern to which the variance is compared, the output dependent on whether the variance matches the pattern within a threshold. In an example, the model includes a plurality of patterns including the pattern, and wherein the output further depends on which of the plurality of patterns the variance matches within a corresponding threshold. In an example, the pattern includes a position element and an orientation element, the position element corresponding to a position of a marker in the variance and the orientation element corresponding to an orientation of the variance.

In an example, patterns in the plurality of patterns correspond to elastic material gestures. In an example, a subset of the gestures result from multiple probes deforming the elastic material. In an example, a subset of the gestures result from a probe deforming the elastic material over at least two periods in time. In an example, the elastic material gestures include at least one of a push, a pull, a depression, an elevation, a squeeze, a separation, a sheer, or a twist.

In an example, where the first morphological sample and the second morphological sample are images, the variance is a difference between a normalized version of an image for the first morphological sample and a normalized versions of an image for the second morphological sample.

At operation 720, the output of operation 715 may be translated input a user input parameter. In an example, a plurality of regions of the elastic material is identified. In an example, the user input parameter when derived from a region variance in a first region of the plurality of regions is different than the user input parameter when derived from the region variance in a second region from the plurality of regions, the region variance being the portion of the variance corresponding to a region in the plurality of regions.

At operation 725, an action of the device that corresponds to the user input parameter may be invoked. In an example, the action of the device includes outputting perceptible feedback from the device. In an example, the action of the device includes providing the user input parameter to an application of the device and displaying the result provided by the application. In an example, the action of the device includes transmitting the user input to another device.

At optional operation 730, light may be emitted to capture the morphological samples. In an example, the light is a wavelength to which a photonic sensor of the device is sensitive. In an example, the light is within the visible spectrum of a person. In an example, the light is not within the visible spectrum of a person. In an example, the light is in the infrared. In an example, the light provides a pattern on the elastic material. In an example, the pattern indicates a region of the elastic material to the user. In an example, the pattern facilitates normalizing the samples for comparison.

At optional operation 735, a context signal may be received. In an example, the sensor is enabled when the context signal is in a first state and disabled otherwise. In an example, the variance of operation 710 is modified based on the state of the context signal. In an example, the context signal is incorporated into the production of the output of operation 715. In an example, the translating of operation 720 is modified such that the output of the variance is translated into the user input parameter from a plurality of user input parameters based on the context signal. In an example, the context signal is a proximity measurement to another device. In an example, the context signal is an identification of a social situation.

Figure 8:
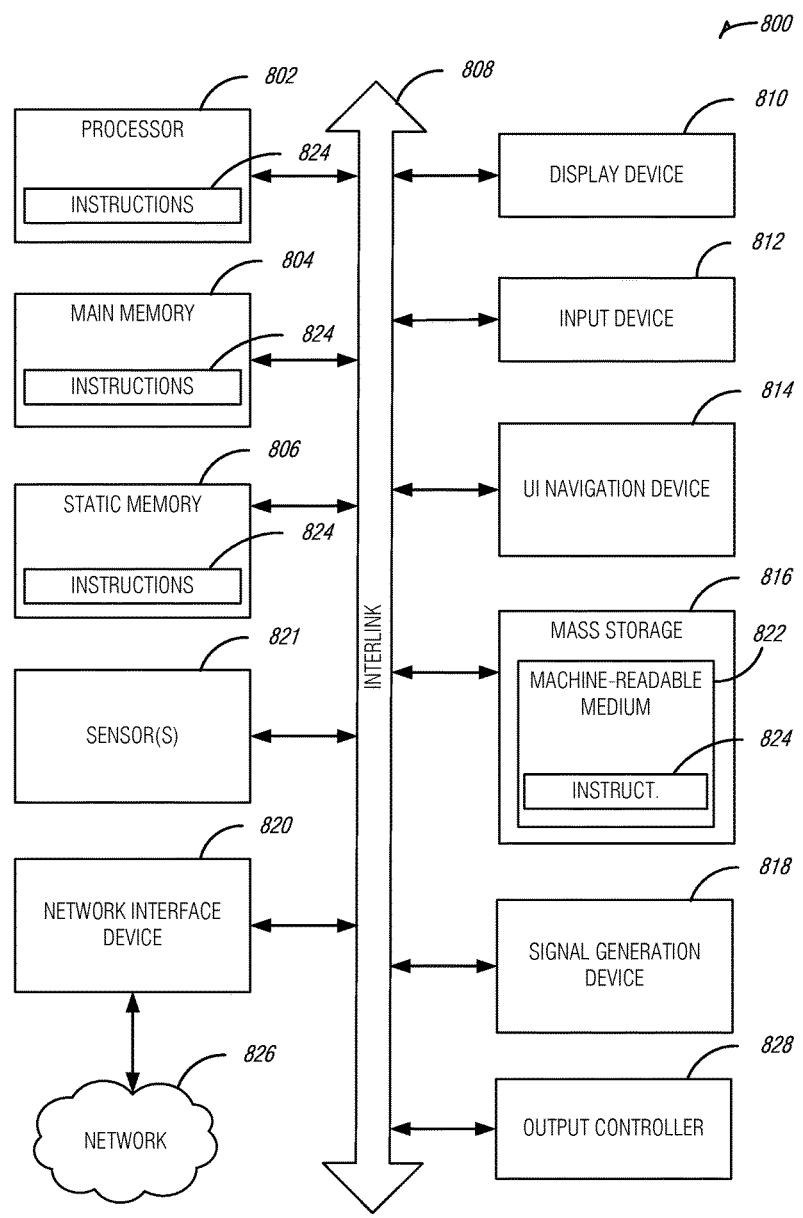
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 may include subject matter (such as a system, apparatus, or device for user input via elastic deformation of a material) comprising: a sensor to observe morphology of an elastic material including a first morphological sample and a second morphological sample; a comparator to compare the first morphological sample and the second morphological sample against each other to ascertain a variance; a filter to produce an output by applying a model to the variance; an adapter to translate the output into a user input parameter; and a user interface to invoke an action of the device corresponding to the user input parameter.

In Example 2, the subject matter of Example 1 may optionally include, wherein the material is skin.

In Example 3, the subject matter of any of Examples 1-2 may optionally include, wherein the material is a fabric.

In Example 4, the subject matter of any of Examples 1-3 may optionally include, wherein the model includes a pattern to which the variance is compared, the output dependent on whether the variance matches the pattern within a threshold.

In Example 5, the subject matter of Example 4 may optionally include, wherein the model includes a plurality of patterns including the pattern, and wherein the output further depends on which of the plurality of patterns the variance matches within a corresponding threshold.

In Example 6, the subject matter of Example 5 may optionally include, wherein patterns in the plurality of patterns correspond to elastic material gestures.

In Example 7, the subject matter of Example 6 may optionally include, wherein a subset of the gestures result from multiple probes deforming the elastic material.

In Example 8, the subject matter of any of Examples 6-7 may optionally include, wherein a subset of the gestures result from a probe deforming the elastic material over at least two periods in time.

In Example 9, the subject matter of any of Examples 6-8 may optionally include, wherein the elastic material gestures include at least one of a push, a pull, a depression, an elevation, a squeeze, a separation, a sheer, or a twist.

In Example 10, the subject matter of any of Examples 4-9 may optionally include, wherein the pattern includes a position element and an orientation element, the position element corresponding to a position of a marker in the variance and the orientation element corresponding to an orientation of the variance.

In Example 11, the subject matter of any of Examples 1-10 may optionally include, wherein at least one of the sensor or the filter identify a plurality of regions of the elastic material.

In Example 12, the subject matter of Example 11 may optionally include, wherein the user input parameter when derived from a region variance in a first region of the plurality of regions is different than the user input parameter when derived from the region variance in a second region from the plurality of regions, the region variance being the portion of the variance corresponding to a region in the plurality of regions.

In Example 13, the subject matter of any of Examples 1-12 may optionally include, wherein at least one of the sensor, the comparator, or the filter is calibrated to ignore morphological changes of the elastic material corresponding to unintentional deformation.

In Example 14, the subject matter of any of Examples 1-13 may optionally include, wherein the sensor is photonic.

In Example 15, the subject matter of Example 14 may optionally include, wherein to observe the morphology includes capturing photons reflected from the elastic material.

In Example 16, the subject matter of Example 15 may optionally include, wherein the first morphological sample and the second morphological sample are images captured by the sensor.

In Example 17, the subject matter of Example 16 may optionally include, wherein the variance is a difference between a normalized version of an image for the first morphological sample and a normalized versions of an image for the second morphological sample.

In Example 18, the subject matter of any of Examples 14-17 may optionally include an emitter positioned to emit light to reflect from the elastic material to the sensor, the sensor being sensitive to a wavelength of the light.

In Example 19, the subject matter of Example 18 may optionally include, wherein the wavelength is infrared.

In Example 20, the subject matter of any of Examples 1-19 may optionally include, wherein the sensor is a pressure sensor.

In Example 21, the subject matter of any of Examples 1-20 may optionally include, wherein the sensor is an electrical component sensor.

In Example 22, the subject matter of Example 21 may optionally include, wherein the electrical component is at least one of conductance or capacitance.

In Example 23, the subject matter of Example 1-22 may optionally include a flexible material, wherein the sensor is embedded in the flexible material adhered to the elastic material such that morphological changes in the elastic material are reflected in the flexible material.

In Example 24, the subject matter of Example 1-23 may optionally include a context sensor to receive a context signal.

In Example 25, the subject matter of Example 24 may optionally include, wherein the sensor is enabled when the context signal is in a first state and disabled otherwise.

In Example 26, the subject matter of any of Examples 24-25 may optionally include, wherein the comparator is to modify the variance based on a state of the context signal.

In Example 27, the subject matter of any of Examples 24-26 may optionally include, wherein the model incorporates the context signal in producing the output.

In Example 28, the subject matter of any of Examples 24-27 may optionally include, wherein the adapter translates the output of the variance into the user input parameter from a plurality of user input parameters based on the context signal.

In Example 29, the subject matter of any of Examples 24-28 may optionally include, wherein the context signal is a proximity measurement for another device.

In Example 30, the subject matter of any of Examples 24-29 may optionally include, wherein the context signal is an identification of a social situation.

In Example 31, the subject matter of any of Examples 1-30 may optionally include, wherein the action of the device includes transmitting the user input to another device.

In Example 32, the subject matter of any of Examples 1-31 may optionally include, wherein the action of the device includes outputting perceptible feedback from the device.

In Example 33, the subject matter of Example 32 may optionally include, wherein the action of the device includes providing the user input parameter to an application of the device and displaying the result provided by the application.

In Example 34, the subject matter of any of Examples 1-33 may optionally include, wherein the device is a wearable device.

In Example 35, the subject matter of Example 34 may optionally include, wherein the device is a bracelet.

Example 36 may include, or may optionally be combine with the subject matter of any of Examples 1-35 to include, subject matter (such as a method, means for performing acts, or machine readable medium including instructions that, when performed by a machine cause the machine to perform acts) comprising: observing, via a sensor, morphology of an elastic material including a first morphological sample and a second morphological sample; comparing, via a comparator, the first morphological sample and the second morphological sample against each other to ascertain a variance; filtering the variance to produce an output by applying a model to the variance; translating, via an adapter, the output into a user input parameter; and invoking an action of a device corresponding to the user input parameter.

In Example 37, the subject matter of Example 36 may optionally include, wherein the material is skin.

In Example 38, the subject matter of any of Examples 36-37 may optionally include, wherein the material is a fabric.

In Example 39, the subject matter of any of Examples 36-38 may optionally include, wherein the model includes a pattern to which the variance is compared, the output dependent on whether the variance matches the pattern within a threshold.

In Example 40, the subject matter of Example 39 may optionally include, wherein the model includes a plurality of patterns including the pattern, and wherein the output further depends on which of the plurality of patterns the variance matches within a corresponding threshold.

In Example 41, the subject matter of Example 40 may optionally include, wherein patterns in the plurality of patterns correspond to elastic material gestures.

In Example 42, the subject matter of Example 41 may optionally include, wherein a subset of the gestures result from multiple probes deforming the elastic material.

In Example 43, the subject matter of Example 42 may optionally include, wherein a subset of the gestures result from a probe deforming the elastic material over at least two periods in time.

In Example 44, the subject matter of any of Examples 42-43 may optionally include, wherein the elastic material gestures include at least one of a push, a pull, a depression, an elevation, a squeeze, a separation, a sheer, or a twist.

In Example 45, the subject matter of any of Examples 40-44 may optionally include, wherein the pattern includes a position element and an orientation element, the position element corresponding to a position of a marker in the variance and the orientation element corresponding to an orientation of the variance.

In Example 46, the subject matter of any of Examples 36-45 may optionally include, wherein at least one of the sensor or the filter identify a plurality of regions of the elastic material.

In Example 47, the subject matter of Example 46 may optionally include, wherein the user input parameter when derived from a region variance in a first region of the plurality of regions is different than the user input parameter when derived from the region variance in a second region from the plurality of regions, the region variance being the portion of the variance corresponding to a region in the plurality of regions.

In Example 48, the subject matter of any of Examples 36-47 may optionally include, wherein at least one of the sensor, the comparator, or the filter is calibrated to ignore morphological changes of the elastic material corresponding to unintentional deformation.

In Example 49, the subject matter of any of Examples 36-48 may optionally include, wherein the sensor is photonic.

In Example 50, the subject matter of Example 49 may optionally include, wherein observing the morphology includes capturing photons reflected from the elastic material.

In Example 51, the subject matter of Example 50 may optionally include, wherein the first morphological sample and the second morphological sample are images captured by the sensor.

In Example 52, the subject matter of Example 51 may optionally include, wherein the variance is a difference between a normalized version of an image for the first morphological sample and a normalized versions of an image for the second morphological sample.

In Example 53, the subject matter of any of Examples 49-52 may optionally include emitting light, via an emitter positioned to emit light to reflect from the elastic material to the sensor, the sensor being sensitive to a wavelength of the light.

In Example 54, the subject matter of Example 53 may optionally include, wherein the wavelength is infrared.

In Example 55, the subject matter of any of Examples 36-54 may optionally include, wherein the sensor is a pressure sensor.

In Example 56, the subject matter of any of Examples 36-55 may optionally include, wherein the sensor is an electrical component sensor.

In Example 57, the subject matter of Example 56 may optionally include, wherein the electrical component is at least one of conductance or capacitance.

In Example 58, the subject matter of any of Examples 36-57 may optionally include, wherein the sensor is embedded in a flexible material adhered to the elastic material such that morphological changes in the elastic material are reflected in the flexible material.

In Example 59, the subject matter of any of Examples 36-58 may optionally include receiving a context signal.

In Example 60, the subject matter of Example 59 may optionally include, wherein the sensor is enabled when the context signal is in a first state and disabled otherwise.

In Example 61, the subject matter of any of Examples 59-60 may optionally include modifying the variance based on a state of the context signal.

In Example 62, the subject matter of any of Examples 59-61 may optionally include, wherein the model incorporates the context signal in producing the output.

In Example 63, the subject matter of any of Examples 59-62 may optionally include, wherein translating includes translating the output of the variance into the user input parameter from a plurality of user input parameters based on the context signal.

In Example 64, the subject matter of any of Examples 59-63 may optionally include, wherein the context signal is a proximity measurement for another device.

In Example 65, the subject matter of any of Examples 59-64 may optionally include, wherein the context signal is an identification of a social situation.

In Example 66, the subject matter of any of Examples 36-65 may optionally include, wherein the action of the device includes transmitting the user input to another device.

In Example 67, the subject matter of examples 36-66 may optionally include, wherein the action of the device includes outputting perceptible feedback from the device.

In Example 68, the subject matter of Example 67 may optionally include, wherein the action of the device includes providing the user input parameter to an application of the device and displaying the result provided by the application.

In Example 69, the subject matter of any of Examples 36-68, wherein the device is a wearable device.

In Example 70, the subject matter of Example 69, wherein the device is a bracelet.

In Example 71, at least one machine readable medium including instructions that, when executed by a machine, cause the machine to perform the subject matter of any of Examples 36-70.

In Example 72, a system including means to perform any of the subject matter of Examples 36-70.

Example 73 may include, or may optionally be combined with the subject matter of any of Examples 1-72 to include, subject matter (such as a device, apparatus, or system for user input via elastic deformation of a material) comprising: means for observing, via a sensor, morphology of an elastic material including a first morphological sample and a second morphological sample; means for comparing, via a comparator, the first morphological sample and the second morphological sample against each other to ascertain a variance; means for filtering the variance to produce an output by applying a model to the variance; means for translating, via an adapter, the output into a user input parameter; and means for invoking an action of a device corresponding to the user input parameter.

In Example 74, the subject matter of Example 73 may optionally include, wherein the material is skin.

In Example 75, the subject matter of any of Examples 73-74 may optionally include, wherein the material is a fabric.

In Example 76, the subject matter of any of Examples 73-75 may optionally include, wherein the model includes a pattern to which the variance is compared, the output dependent on whether the variance matches the pattern within a threshold.

In Example 77, the subject matter of Example 76 may optionally include, wherein the model includes a plurality of patterns including the pattern, and wherein the output further depends on which of the plurality of patterns the variance matches within a corresponding threshold.

In Example 78, the subject matter of Example 77 may optionally include, wherein patterns in the plurality of patterns correspond to elastic material gestures.

In Example 79, the subject matter of Example 78 may optionally include, wherein a subset of the gestures result from multiple probes deforming the elastic material.

In Example 80, the subject matter of Example 79 may optionally include, wherein a subset of the gestures result from a probe deforming the elastic material over at least two periods in time.

In Example 81, the subject matter of any of Examples 79-80 may optionally include, wherein the elastic material gestures include at least one of a push, a pull, a depression, an elevation, a squeeze, a separation, a sheer, or a twist.

In Example 82, the subject matter of any of Examples 77-81 may optionally include, wherein the pattern includes a position element and an orientation element, the position element corresponding to a position of a marker in the variance and the orientation element corresponding to an orientation of the variance.

In Example 83, the subject matter of any of Examples 73-82 may optionally include, wherein at least one of the sensor or the filter identify a plurality of regions of the elastic material.

In Example 84, the subject matter of Example 83 may optionally include, wherein the user input parameter when derived from a region variance in a first region of the plurality of regions is different than the user input parameter when derived from the region variance in a second region from the plurality of regions, the region variance being the portion of the variance corresponding to a region in the plurality of regions.

In Example 85, the subject matter of any of Examples 73-84 may optionally include, wherein at least one of the sensor, the comparator, or the filter is calibrated to ignore morphological changes of the elastic material corresponding to unintentional deformation.

In Example 86, the subject matter of any of Examples 73-85 may optionally include, wherein the sensor is photonic.

In Example 87, the subject matter of Example 86 may optionally include, wherein the means for observing the morphology includes means for capturing photons reflected from the elastic material.

In Example 88, the subject matter of Example 87 may optionally include, wherein the first morphological sample and the second morphological sample are images captured by the sensor.

In Example 89, the subject matter of Example 88 may optionally include, wherein the variance is a difference between a normalized version of an image for the first morphological sample and a normalized versions of an image for the second morphological sample.

In Example 90, the subject matter of any of Examples 86-89 may optionally include means for emitting light, via an emitter positioned to emit light to reflect from the elastic material to the sensor, the sensor being sensitive to a wavelength of the light.

In Example 91, the subject matter of Example 90 may optionally include, wherein the wavelength is infrared.

In Example 92, the subject matter of any of Examples 73-91 may optionally include, wherein the sensor is a pressure sensor.

In Example 93, the subject matter of any of Examples 73-92, wherein the sensor is an electrical component sensor.

In Example 94, the subject matter of Example 93 may optionally include, wherein the electrical component is at least one of conductance or capacitance.

In Example 95, the subject matter of any of Examples 73-94 may optionally include, wherein the sensor is embedded in a flexible material adhered to the elastic material such that morphological changes in the elastic material are reflected in the flexible material.

In Example 96, the subject matter of any of Examples 73-95 may optionally include means for receiving a context signal.

In Example 97, the subject matter of Example 96 may optionally include, wherein the sensor is enabled when the context signal is in a first state and disabled otherwise.

In Example 98, the subject matter of any of Examples 96-97 may optionally include means for modifying the variance based on a state of the context signal.

In Example 99, the subject matter of any of Examples 96-98 may optionally include, wherein the model incorporates the context signal in producing the output.

In Example 100, the subject matter of any of Examples 96-99 may optionally include, wherein the means for translating includes means for translating the output of the variance into the user input parameter from a plurality of user input parameters based on the context signal.

In Example 101, the subject matter of any of Examples 96-100 may optionally include, wherein the context signal is a proximity measurement for another device.

In Example 102, the subject matter of any of Examples 96-101 may optionally include, wherein the context signal is an identification of a social situation.

In Example 103, the subject matter of any of Examples 73-102 may optionally include, wherein the action of the device includes transmitting the user input to another device.

In Example 104, the subject matter of any of Examples 73-103 may optionally include, wherein the action of the device includes outputting perceptible feedback from the device.

In Example 105, the subject matter of Example 104 may optionally include, wherein the action of the device includes providing the user input parameter to an application of the device and displaying the result provided by the application.

In Example 106, the subject matter of any of Examples 73-105 may optionally include, wherein the device is a wearable device.

In Example 107, the subject matter of Example 106 may optionally include, wherein the device is a bracelet.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for input via elastic deformation of a material, the device comprising:
   a sensor to observe morphology of an elastic material including a first morphological sample and a second morphological sample, the elastic material capable of elastic deformation that includes returning to an original shape after being deformed into a variant shape;
   a comparator to compare the first morphological sample and the second morphological sample against each other to ascertain a variance;
   a filter to produce an output by applying a model to the variance;
   an adapter to translate the output into a user input parameter; and
   a user interface to invoke an action of the device corresponding to the user input parameter.

2. The device of claim 1, wherein the material is skin.

3. The device of claim 1, wherein the model includes a pattern to which the variance is compared, the output dependent on whether the variance matches the pattern within a threshold.

4. The device of claim 3, wherein the model includes a plurality of patterns including the pattern, and wherein the output further depends on which of the plurality of patterns the variance matches within a corresponding threshold.

5. The device of claim 1, wherein at least one of the sensor, the comparator, or the filter is calibrated to ignore morphological changes of the elastic material corresponding to unintentional deformation.

6. The device of claim 1, comprising a flexible material, wherein the sensor is embedded in the flexible material adhered to the elastic material such that morphological changes in the elastic material are reflected in the flexible material.

7. The device of claim 1, comprising a context sensor to receive a context signal.

8. The device of claim 7, wherein the sensor is enabled when the context signal is in a first state and disabled otherwise.

9. The device of claim 7, wherein the context signal is a proximity measurement for another device.

10. A method for input via elastic deformation of a material, the method comprising:
    observing, via a sensor, morphology of an elastic material including a first morphological sample and a second morphological sample, the elastic material capable of elastic deformation that includes returning to an original shape after being deformed into a variant shape;
    comparing, via a comparator, the first morphological sample and the second morphological sample against each other to ascertain a variance;
    filtering the variance to produce an output by applying a model to the variance;
    translating, via an adapter, the output into a user input parameter; and
    invoking an action of a device corresponding to the user input parameter.

11. The method of claim 10, wherein the material is skin.

12. The method of claim 10, wherein the model includes a pattern to which the variance is compared, the output dependent on whether the variance matches the pattern within a threshold.

13. The method of claim 12, wherein the model includes a plurality of patterns including the pattern, and wherein the output further depends on which of the plurality of patterns the variance matches within a corresponding threshold.

14. The method of claim 10, wherein at least one of the sensor, the comparator, or the filter is calibrated to ignore morphological changes of the elastic material corresponding to unintentional deformation.

15. The method of claim 10, wherein the sensor is embedded in a flexible material adhered to the elastic material such that morphological changes in the elastic material are reflected in the flexible material.

16. The method of claim 10, comprising receiving a context signal, wherein the sensor is enabled when the context signal is in a first state and disabled otherwise.

17. The method of claim 16, wherein the context signal is a proximity measurement for another device.

18. At least one non-transitory machine readable medium including instructions that, when executed by a machine, cause the machine to perform operations comprising:
    observing, via a sensor, morphology of an elastic material including a first morphological sample and a second morphological sample, the elastic material capable of elastic deformation that includes returning to an original shape after being deformed into a variant shape;
    comparing, via a comparator, the first morphological sample and the second morphological sample against each other to ascertain a variance;
    filtering the variance to produce an output by applying a model to the variance;
    translating, via an adapter, the output into a user input parameter; and
    invoking an action of a device corresponding to the user input parameter.

19. The at least one machine readable medium of claim 18, wherein the material is skin.

20. The at least one machine readable medium of claim 18, wherein the model includes a pattern to which the variance is compared, the output dependent on whether the variance matches the pattern within a threshold.

21. The at least one machine readable medium of claim 20, wherein the model includes a plurality of patterns including the pattern, and wherein the output further depends on which of the plurality of patterns the variance matches within a corresponding threshold.

22. The at least one machine readable medium of claim 18, wherein at least one of the sensor, the comparator, or the filter is calibrated to ignore morphological changes of the elastic material corresponding to unintentional deformation.

23. The at least one machine readable medium of claim 18, wherein the sensor is embedded in a flexible material adhered to the elastic material such that morphological changes in the elastic material are reflected in the flexible material.

24. The at least one machine readable medium of claim 18, wherein the operations include receiving a context signal, wherein the sensor is enabled when the context signal is in a first state and disabled otherwise.

25. The at least one machine readable medium of claim 24, wherein the context signal is a proximity measurement for another device.

* * * * *